3,462,623
DOUBLE INSULATED POWER TOOLS
William A. Batson and Don B. Winchester, Pickens, S.C., assignors to The Singer Company, New York, N.Y., a corporation of New Jersey
Filed Apr. 16, 1968, Ser. No. 721,788
Int. Cl. H02k 7/14
U.S. Cl. 310—50                           8 Claims

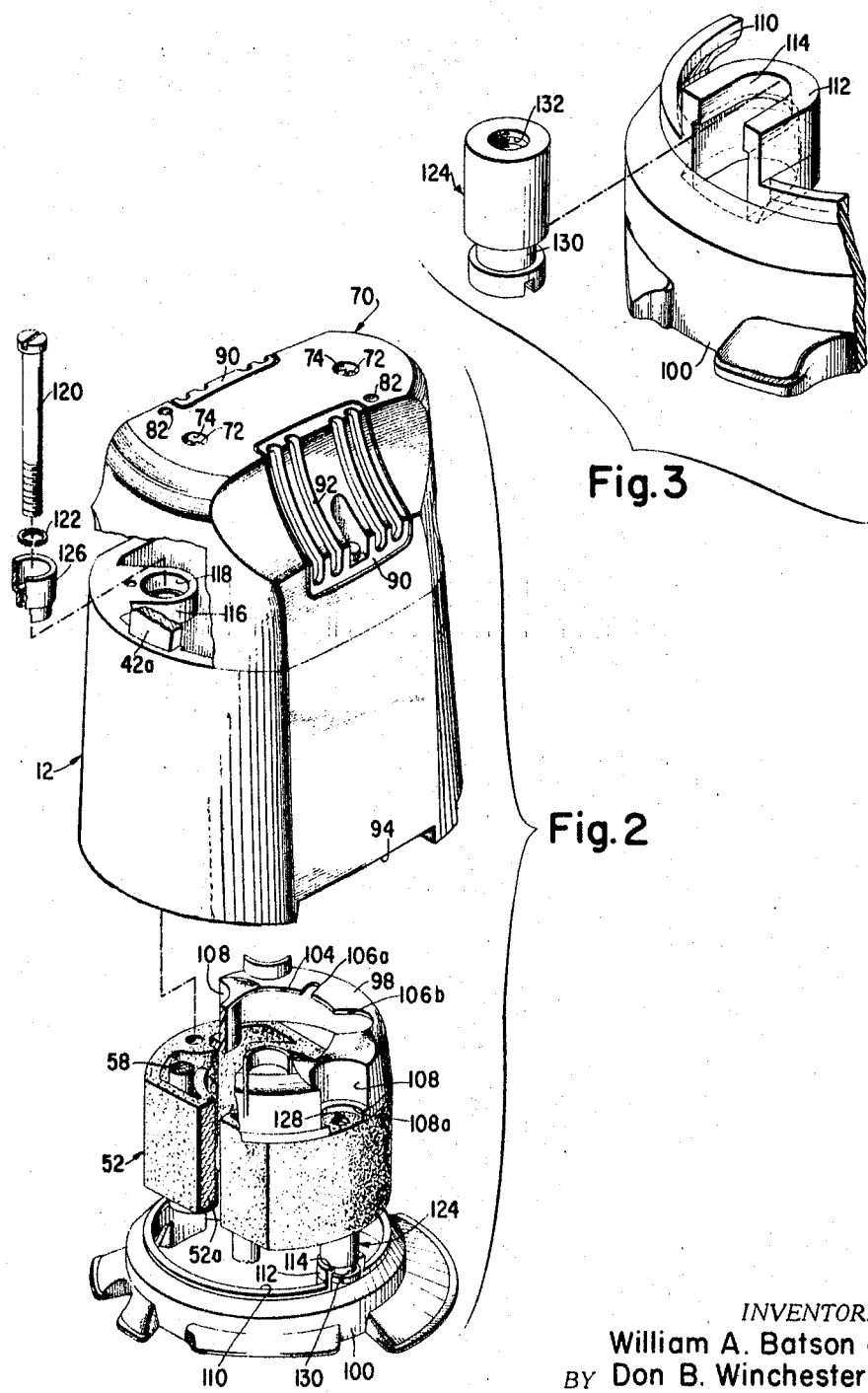

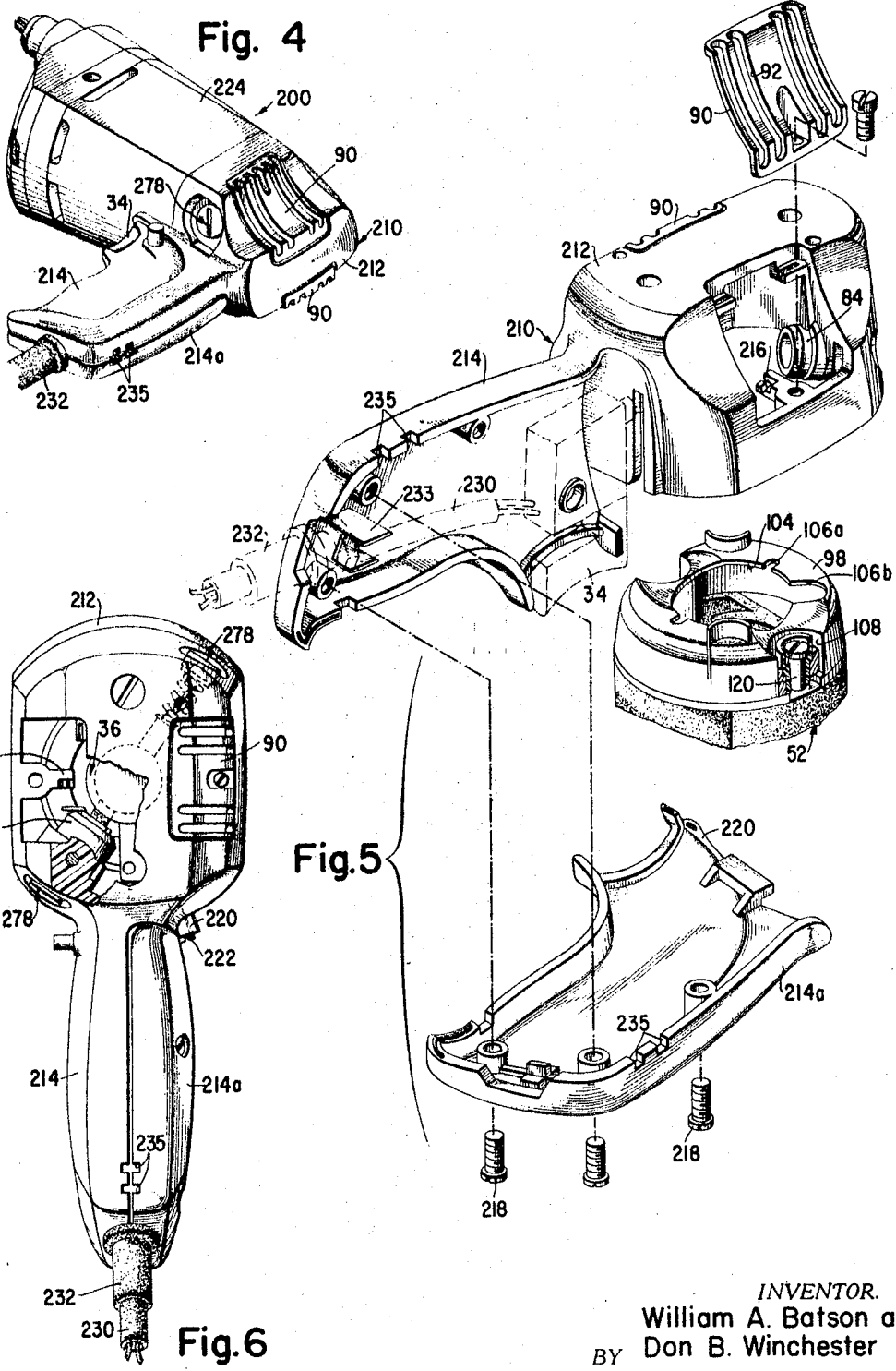

ABSTRACT OF THE DISCLOSURE

A double insulated power tool in which the motor has functional insulation and protecting insulation. The protecting insulation structure includes an integrally insulated field core having a pair of insulated shrouds clamped respectively to either end thereof and forming a dielectric shell substantially enclosing the field and holding it in spaced insulated relation with respect to the housing. This structure is combined with an insulating tube between the shaft and the armature core and an insulated end-cover supporting insulated brush holders to form a power tool which does not require a ground connection to prevent electrical shock to the operator.

Background of the invention

Heretofore, in an attempt to protect the operator of an electrically driven power tool or appliance grounding thereof via a three pronged plug was recommended. It has become more and more evident that the use of the grounded plug or adapter has failed to serve its intended purpose. Investigation of accidental electric shock cases show either that (1) the operator is willfully negligent, (2) is ignorant of the shock hazards present, or (3) uses the tool or appliance on a wiring system that has no electrical ground.

In view of the failure of the grounded plug or adapter, attempts have been made to overcome the problem of accidental electric shock to the operator of hand held power tools and appliances by providing an additional dielectric barrier, or as it is commonly termed a "double insulated" power tool or appliance. This has been done, for example, by using a housing of dielectric material, such as plastic, to completely enclose the "live" parts of the motor. Another example is the use of plastic liners or sleeves assembled in various ways to isolate the "live" parts of the motor from those parts which the operator normally comes in contact. However, the use of plastic for the housing or for the assembled dielectric barrier, while solving some problems, creates a host of other problems related to cost, structural strength, dimensional stability, heat dissipation, flammability, and the like.

Summary of the invention

In accordance with the present invention the improved double insulated power tool is driven by an electric motor having an armature winding, a field winding and a commutator connected to an electric potential and special means are provided to protect against transmitting the electric potential to said tool. The tool includes the combination of a housing, an insulated tube affixed to a rotatably journaled shaft in the housing which carries the armature and commutator. The field core is integrally insulated, and is enclosed by a field shroud at one end and a fan shroud at the other. Clamping means clamp the field shroud, field core and fan shroud to the housing in an insulated manner that is in such a manner that, if the field core should become connected to electric potential through failure of the functional insulation, said potential could not be transmitted to the housing. A spacer is included in the clamping means to space the fan shroud a predetermined distance from the adjacent end of the field core.

In the present instance the term "double insulated" power tool or appliance means that in addition to the basic functional insulation necessary for the proper functioning of the tool or appliance there is provided a secondary system of insulation designated generally as protecting insulation. The protecting insulation denotes an independent insulation, provided, in addition to the functional insulation, to insure against electric shock to the operator of the power tool in case of failure of the functional insulation. In the protecting insulation an enclosure of insulating material may form a part or the whole of the protecting insulation. In other words, the term "double insulation" denotes an insulation system comprised of functional insulation and protecting insulation, with the two insulations physically separated and so arranged that they are not simultaneously subjected to the same deteriorating influences to the same degree.

It is therefore an object of the present invention to provide an improved double insulated power tool or appliance which overcomes the prior art disadvantages; which is simple, economical and reliable; which eliminates the need for a grounded three prong plug or adapter; which provides both functional insulation and protecting insulation; which uses protecting insulation having clamping means, the metal portion of which is dielectrically isolated from the housing; which includes an integrally insulated field core; which is used in a tool having a metal housing and shaft; which includes an insulated end cover, brush assembly and operator actuated switch; which uses an insulating tube to separate the metal shaft and the armature core; and which uses a pair of insulated shrouds clamped to either end of the integrally insulated field core to separate the same from the housing.

Other objects and advantages will be apparent from the following description of the invention and the novel features will be particularly pointed out hereinafter in the claims.

Brief description of the drawings

This invention is illustrated in the accompanying drawings in which:

FIG. 2 is an exploded perspective view, partly in section, of the motor housing and protecting insulation of FIG. 1.

FIG. 3 is an enlarged perspective sectional view of the fan shroud and spacer nut of the protecting insulation in unassembled position.

FIG. 4 is a perspective view of a drill embodying the present invention.

FIG. 5 is an exploded perspective view of a combined end cover and handle for the drill of FIG. 4, including a partial view of the field shroud clamped to the field core.

FIG. 6 is an elevational view, partly in section, taken along the rear of the drill of FIG. 4.

Description of the invention

Figure 1:
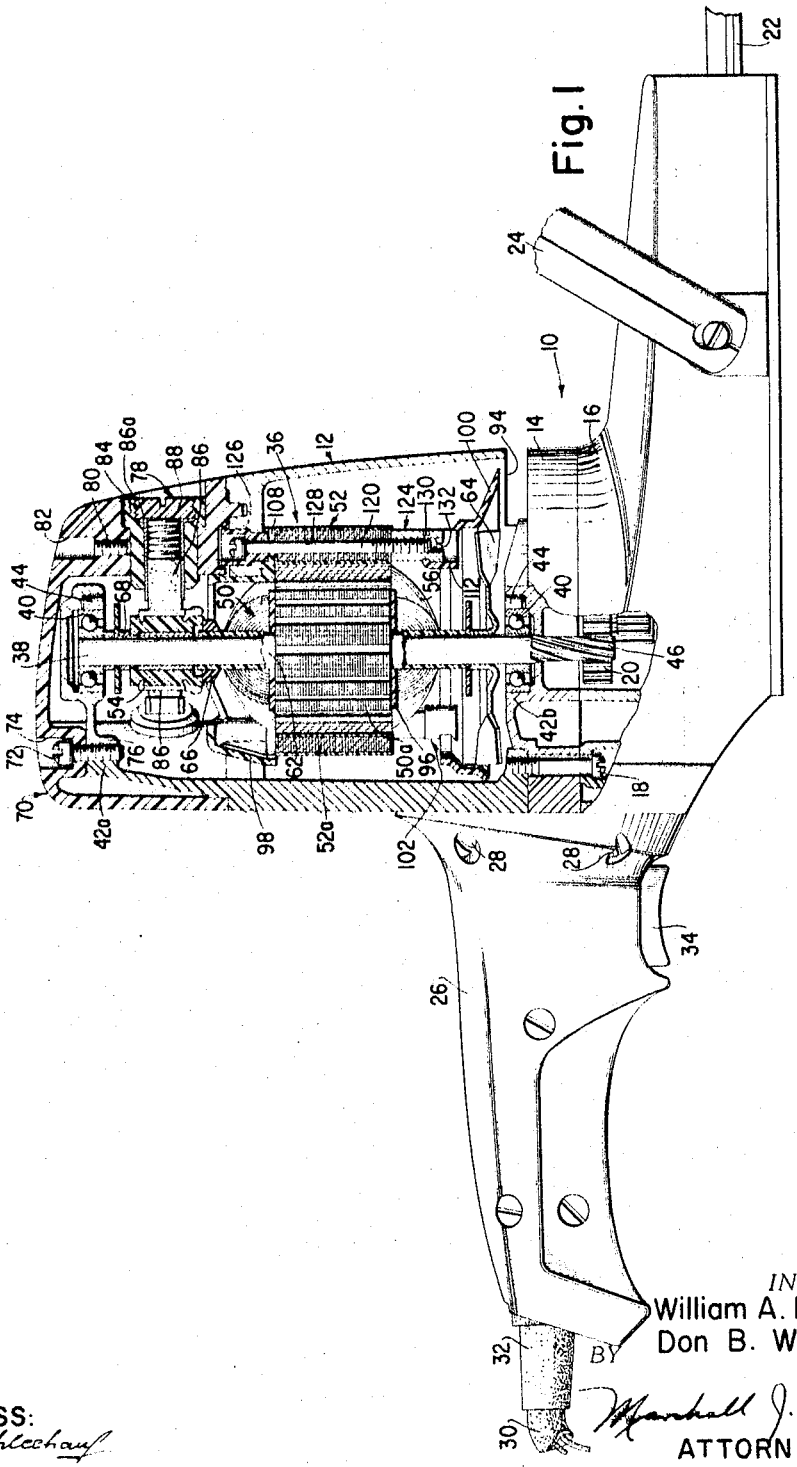
FIG. 1 is a side elevational view, partly in section, of a typical power tool, such as a hedge trimmer embodying the present invention.

A conventional power tool, as for example, a hedge trimmer, is shown in FIGS. 1, 2 and 3 embodying the present invention. The hedge trimmer is but one typical example of a double insulated power tool or appliance to which the present invention is applicable.

The hedge trimmer as illustrated in FIG. 1 includes a motor housing 12 which is connected at the bottom thereof to a gear housing cover 14 and a gear housing 16 by screws 18. A gear train 20 is suitably connected to drive a pair of cutting blades 22 which extend outwardly of a forward projection of the gear housing, which projection carries a bail handle 24. A main handle 26 is connected to the opposite side of the gear housing 16 and motor housing 12 as by screws 28. A cord 30 passes through a bend relief 32 into the handle 26 to be suitably connected in circuit with a switch 34 and a motor, designated generally as 36, which is operated upon actuation of the switch 34 in the usual manner.

A shaft 38 of the motor 36 is journaled in ball bearings 40 carried in bearing brackets 42a and 42b of the motor housing 12 and the gear housing cover 14, respectively. In order to insure proper alignment bearing retaining plugs 44 may be associated with the mounting of the bearings 40. The lower end of the shaft 38 has an integrally formed pinion 46 which engages and drives the gear train 20 to power the movement of the cutting blades 22 in a manner well known in the art.

The motor housing 12, the gear housing cover 14, the gear housing 16 and the armature shaft 38 may all be made of metal so as to provide the power tool 10 with the proper structural strength and dimensional rigidity in addition to the other desirable characteristics most economically provided by metal. However, in order to properly protect the operator of the power tool 10 from the hazards of accidental electrical shock or contact with the electric potential to which the tool is connected by the cord 30, a second or protecting insulation is provided as set forth hereinafter.

The functional insulation is that insulation necessary for the proper functioning of the tool such as that used on the wire making up the armature winding and field winding, the armature slot insulation, and the insulation for the cord 30. In the absence of functional insulation it would be impossible to properly operate the tool, and therefore its use has been and will continue to be required.

The electric motor 36 has an armature 50 and a commutator 54 carried on the armature shaft 38 with the field 52 disposed in superposition about the armature 50 in the usual manner.

Stacked steel laminations make up the core for the armature 50 and the field 52, about which is disposed an armature winding 56 and a field winding 58 (shown in FIG. 2) respectively. The field 52 is provided with a complete surface coating of an insulation, such as epoxy resin, except for the gap face of the field poles 60, before the field windings 58 are placed thereon. Thus, the field core may be referred to as an integrally insulated field core 52a.

An insulating tube 62 is affixed to the armature shaft 38 to insulate said shaft from the armature core 50a. The fan 64 is connected to the armature 38 adjacent the lower end of the insulating tube 62. The commutator 54 may be made of a preformed molded plastic unit having an internal brass sleeve for pressing directly on the armature shaft 38 adjacent the upper end of the insulating sleeve 62. A rubber washer 66 is disposed about the upper end of the insulating tube 62 between the armature windings 56 and the commutator 54. A bushing 68 is disposed on the shaft between the upper end of the commutator and the adjacent bearing 40.

An insulated end cover 70, illustrated in FIGS. 1 and 2, encloses the open upper end of the motor housing 12, and is connected thereto by screws 72 passing into countersunk apertures 74 in the cover to be threadedly received in bosses 76 formed in the bearing bracket 42a. A pair of brush assemblies 78 are mounted in alignment to each other on either side of the end cover 70 and set in position by a set screw 80 extending through an aperture 82 of the end cover to engage the brush holder 84. A spring biased brush 86 engages the outer periphery of the commutator 54 and is held by a brush tube 86a within the brush holder 84. An insulated brush cap 88 is screwed into the open outer end of the brush holder 84, which is also made of insulating material. The brush assemblies 78 axial line is inclined from the longitudinal axis of the handle 26. The brushes 86 may be inspected upon removal of an access cover 90 located on opposite sides of the shaped end cover 70. Inlet apertures 92 in the form of a purality of vertical slots in the access cover 90 are provided, and on operation of the motor 36 the fan 64 will induce air therethrough to pass in heat exchange relationship with the components of the motor prior to being discharged from the motor housing 12 through apertures 94 formed at the lower end of the motor housing 12.

Additional protecting insulation may be provided by making the handle 26 of a suitable plastic, or otherwise providing the cord 30 with a protecting insulation within said handle. In any event the part of the switch 34 that the operator contacts will be made of plastic or other suitable dielectric material.

Double insulation, as was discussed hereinbefore, requires that there be no exposed metal directly contacting the functional insulation. Therefore the exposed metal must be separated from the functional insulation either by an air gap of sufficient dimensions to prevent arcing or by a protecting insulation.

To accomplish this end (and, in addition to the insulating tube 62, the insulated end cover 70, the insulated brush assembly 78 and the integrally field core 52a), the protecting insulation also includes insulated end discs 96, shown in FIG. 1, disposed on either end of the armature core 50a; and a pair of preformed insulated shrouds 98 and 100 between which the field 52, including the field core 52a and the field windings 58, are held in a nested position by a clamping assembly 102. The shroud 98 may be designated a sa field shroud, while the shroud 100 may be designated as a fan shroud. The field shroud 98 is shaped in the general form of an inverted cup with a central aperture 104 having radial slots 106a and 106b which serve as lead guides. Countersunk apertures 108 are diametrically positioned to extend radially inwardly from the vertical side walls of the field shroud 98 and serve to facilitate the clamping thereof. In assembled position, the bottom edge of the field shroud 98 will contact the upper end of the field core 52a.

The fan shroud 100, as shown in FIGS. 1 and 2 will be spaced from the lower end of the field core 52a. The fan shroud 100 is arranged generally similar to the field shroud 98 and includes a central aperture 110 into which extends radially inwardly a pair of diametrically positioned connection members 112 having semi-circular closed vertical sides and an open face adjacent the vertical side wall of the fan shroud 100. An inwardly extending lip or flange 114 is formed at the upper end of the connection member 112.

A pair of diametrically positioned transverse members 116 having countersunk apertures 118 are formed at the upper end of the motor housing 12 adjacent the bearing bracket 42a to extend radially inwardly a short distance as illustrated in FIG. 2. The transverse member 116 is formed integrally with the motor housing 12 and is therefore also metal. The clamping assembly 102 includes a metal screw 120, a metal washer 122, a metal spacer nut 124 and a plastic or dielectric screw insulator 126. The screw insulator 126 is seated, as shown in FIGS. 1 and 2, in the countersunk aperture 118 of the transverse member 116 and extends into the aperture 108 of the field shroud 98 to contact the lower lip 108a thereof. The screw 120 and the washer 122 are disposed into the screw insulator 126 which insulates them from the transverse member 116. The field shroud 98, the field core 52a, the spacer nut 124 and the fan shroud 100 are passed upwardly into the motor housing 12 for assembly therein. The screw insulator 126 will be disposed in aperture 108 with the screw passing into the longitudinal hole 128 formed in the field core 52a, to be threadedly received in the spacer nut 124. The crew 120 and the spacer nut 124 are each slotted to facilitate their being held or rotated during connection to each other. The shrouds 98 and 100 have insulated flanges which in assembled position are seated in the motor housing 12 and serve to insulate the field core 52a from the commutator 54 and the fan 64, in addition to insulating the armature core 50a from the motor housing 12.

The spacer nut 124, as illustrated in FIG. 3, has an annular groove 130 and a longitudinally threaded hole 132 formed therein which hole will receive the threaded end of the screw 120. The groove 130 is sized for fitted engagement with the lip 114 of the connecting member 112 of the fan shroud 100. Once assembled the special nut 124 and the fan shroud 100 provide a vertically fixed dimension. The upper end of the spacer nut 124 upon being assembled will contact the lower end of the field core 52a and thereby provide for a predetermined distance to be established between the field core 52a and the fan shroud 100.

FIG. 1 illustrates that the metal screw 120 has been isolated from the metal transverse member 116 by the screw insulator 126. The spacer nut 124 is likewise isolated by its fitted engagement in the fan shroud 100 on the one hand and its contact with the integral insulation of the field core 52a on the other hand. Any exposed metal such as the spacer nut 124 has either been isolated by the protecting insulation or is located so as to provide a sufficient air gap, thus, insuring against arcing.

In assembled position the lower end of the end cover 70 extends below the upper end of the field shroud 98.

Another conventional power tool, a drill designated generally as 200, is shown in FIGS. 4, 5 and 6, and embodies the present invention. In this embodiment of the invention, the insulated end closure member, designated generally as 210, is a combined end cover 212 and handle 214, integrally formed as a single unit. For operator convenience the brush assemblies 278 are angularly positioned relative to the longitudinal axis of the handle so as to provide ready access for inspection or changing of the brushes thereof. FIGS. 5 and 6 of the present embodiment show lead guiding fingers 216 extending radially inwardly from the side walls of the end cover 212 adapted to secure therein leads from the motor.

The handle cover 214a is shown in FIGS. 5 and 6 to be connected to the handle 214 by screws 218 passing through apertures in the cover 214a to be threadedly received into holes integrally formed in the handle 214. The forward portion of the cover has a flange 220 into which a screw 222 passes to be threadedly received in an aperture of the motor housing 224 to complete the assembly of the handle cover 214a to the handle 214. The bend relief 232, shown in phantom in FIG. 5 is clamped between the handle 214 and the handle cover 214a. A cord guide 233 is provided in the handle 214 as shown in FIG. 5 for properly positioning the cord 230 therein. Ventilation apertures 235 are also formed in the handle 214 and handle cover 214a.

Except as otherwise set forth hereinabove the embodiment of the present invention, illustrated in FIGS. 4, 5 and 6, is substantially identical to that set forth hereinbefore under the hedge trimmer embodiment.

Accordingly, the double insulation will consist of the functional insulation and the protecting insulation in the same manner and serving the same purpose as described hereinbefore. Expect as otherwise noted, like reference characters designate equivalent or similar components.

It will be understood that various changes in the details, materials, arrangement of parts, and operating conditions which have herein been described and illustrated in the claims in order to explain the nature of the invention may be made by those skilled in the art within the principles and scope of the invention as expressed in the claims.

Having thus set forth the nature of this invention, what we claim herein is:

1. In a power tool driven by an electric motor having an armature winding, field winding and commutator connected to an electric potential and protected against transmitting the electric potential to exposed parts of said tool, the combination of:
    (a) a housing,
    (b) a shaft carrying the armature and the commutator rotatably journaled in the housing,
    (c) an insulating tube means affixed to the shaft,
    (d) means integrally applied to the walls of the field core to insulate the same,
    (e) an insulated annular field shroud enclosing the end of the field adjacent the commutator, and said shroud having an aperture through which the shaft extends,
    (f) a fan mounted on the shaft remote from the commutator,
    (g) an insulated annular fan shroud disposed between the fan and the field and said shroud having an aperture through which the shaft extends,
    (h) means clamping the field shroud, the field core and the fan shroud to the housing,
    (i) spacer means included in the clamping means to space the fan shroud a predetermined distance from the adjacent end of the field core to form a protective air gap therebetween, and
    (j) insulating means included in the clamping means to separate the same from the housing.

2. The combination claimed in claim 1 wherein:
    (a) a screw is included in the clamping means,
    (b) a transverse member is formed in the housing with an aperture therethrough,
    (c) the insulating means defines a bushing disposed in the aperture of the transverse member,
    (d) the spacer means defines a nut held in fitted engagement by fan shroud, and
    (e) the screw passes into the bushing to threadedly engage the nut and clamp the field core intermediate the shrouds.

3. The combination claimed in claim 2 wherein:
    (a) the field core has a longitudinal hole therein, and
    (b) the screw extends through the longitudinal hole of the field core to engage the spacer means, the end of which contacts the field core to separate the same from the fan shroud.

4. The combination claimed in claim 2 wherein:
    (a) the field shroud, field core, nut and fan shroud enter the housing from one side of the transverse member, and
    (b) the bushing and the screw enter the housing from the other side of the transverse member.

5. The combination claimed in claim 2 wherein:
    (a) the transverse member is metal,
    (b) the clamping means has a metal screw seated in the insulated bushing, and the screw is disposed in cantilevered relation to the transverse member, and
    (c) the nut is metal, and is held by the fan shroud in spaced relation to the housing upon being threadedly engaged by the screw.

6. The combination claimed in claim 5 wherein:
    (a) the housing is metal,
    (b) the shaft is metal, and
    (c) an insulated end cover encloses the commutator end of the housing.

7. The combination claimed in claim 6 wherein:
    (a) the end cover engages the housing at a far point which slightly overlaps and is radially spaced from a portion of the field shroud.

8. The combination claimed in claim 7 wherein:
    (a) an insulated brush assembly is mounted in the end cover and includes a pair of brushes which engage the commutator, (b) the brush assembly is disposed in the housing above the field shroud, and
(c) an insulated switch is mounted in the tool remote from and in circuit with the motor for operator actuating said motor.

References Cited

UNITED STATES PATENTS

| | | | |
|---|---|---|---|
| 3,121,813 | 2/1964 | Pratt et al. | 310—50 |
| 3,344,291 | 9/1967 | Pratt | 310—50 |
| 3,413,498 | 11/1968 | Bowen et al. | 310—47 |
| 3,418,504 | 12/1968 | Paule et al. | 310—50 |

WARREN E. RAY, Primary Examiner

U.S. Cl. X.R.

310—45, 89